United States Patent [19]
Cohn

[11] 3,796,858
[45] Mar. 12, 1974

[54] DECORATIVE AQUARIUM HEATER

[76] Inventor: Joseph D. Cohn, 3814 Beverly Dr., Sherman Oaks, Calif. 91403

[22] Filed: Dec. 5, 1972

[21] Appl. No.: 312,351

[52] U.S. Cl................ 219/331, 119/5, 219/216, 219/505, 219/545, 338/208
[51] Int. Cl................................ F24h 1/00
[58] Field of Search........... 219/316, 318, 322, 327, 219/328, 331, 335, 336, 338, 504–505, 516, 523, 545; 338/208, 211, 212; 119/5

[56] References Cited
UNITED STATES PATENTS

| | | | |
|---|---|---|---|
| 2,297,030 | 9/1942 | Snyder | 219/316 X |
| 3,286,077 | 11/1966 | Redford et al. | 219/504 X |
| 3,467,817 | 9/1969 | Fricker | 219/501 |
| 3,059,091 | 10/1962 | Wenzel | 219/318 X |
| 1,334,035 | 3/1920 | Johnson | 219/318 X |

*Primary Examiner*—C. L. Albritton

[57] ABSTRACT

An electrical resistance heater is embedded in an electrically insulating mass configured as a natural element of an aquarium such as a leaf, coral or diver for example. A base adapted to receive the heater component is provided for location under the gravel in the base of the tank. A temperature controlling circuit is provided utilizing solid state devices in a manner permitting a degree of proportional control and eliminating the arcing and potential electrical hazards associated with the conventional bimetallic strip aquarium thermostats.

9 Claims, 3 Drawing Figures

PATENTED MAR 12 1974          3,796,858

DECORATIVE AQUARIUM HEATER

BACKGROUND OF THE INVENTION

Most aquarium heaters presently manufactured utilize resistance heaters of the general type shown in U.S. Pat. Nos. 3,564,589; 3,371,192 or 2,736,791, for example. This type of heater employs a resistance heater mounted within a protective tube. The tube is suspended from the top edge of the aquarium frame, an arrangement which positions the heater along the wall of the aquarium. These heaters require the aquarium cover to be provided with a large opening to permit mounting of the heater which increases the rate of evaporation from the tank. Since they are located at an edge of the tank uniform heating of the water cannot be obtained and undesirable temperature gradients are created. In addition, should the water level drop in the tank serious damage to both the heater and the organizisms in the aquarium can occur. Power to the heating element is controlled by a bimetallic thermostat-switch. The bimetallic thermostats are subject to arcing due to their exposure to line currents. Besides limiting the usful life of the device the arcing creates undesirable interference with radios and television. The device described in U. S. Pat. No. 3,059,091 of T. C. Wenzel attempts to overcome the localized heating problems by embedding a heating element in a decorative aquarium backdrop. While this is a major improvement over the conventional immersion heaters, the device is sensitive to changes in the water levels and does not overcome any of the deficiencies noted above associated with bimetallic thermostats.

SUMMARY OF THE INVENTION

According to this invention, a resistance wire is embedded in an electrically insulating mass configured in a decorative form adapted to be mounted in the bottom of the tank at a location away from the walls of the tank. The decorative configuration provides adequate heat transfer surface, convection currents are not impeded by the immediate proximity of a wall, and the heater, by virtue of its being mounted at the base of the tank, is less likely to be exposd to the air by changes in water levels. A thermistor, mounted in a decorative mass, preferably the same mass as the heater element, is used to detect temperature and the signal so generated used to trigger a silicon controlled rectifier (SCR) so that temperature control without arcing or mechanical movement of the sensing or switching elements is obtained. Placing the sensing element in the same mass as the heater provides an additional safety feature in the event of a loss of water when the unit is in operation since the temperature of the decorative mass then will rapidly rise. This rise in temperature will be sensed by the thermistor causing the control circuit to shut off heater power.

The heater and thermistor are coupled to an externally mounted control box by an insulated cable which is the only component which must pass through the tank cover. The cable is preferably formed from solid rather than braided wire since the solid wire can be permanently bent to conform to the space available in the base of the tank.

It is accordingly an object of this invention to provide an aquarium heater which may be mounted in the base of an aquarium at a distance from the walls.

It is another object of this invention to provide a decorative aquarium heater.

It is another object of this invention to provide a thermostatically controlled aquarium heater of increased reliability, safety and accuracy of temperature control.

These and other objects will be readily apparent from the following description with reference to the accompanying drawings.

DESCRIPTION OF THE INVENTION

Figure 1:
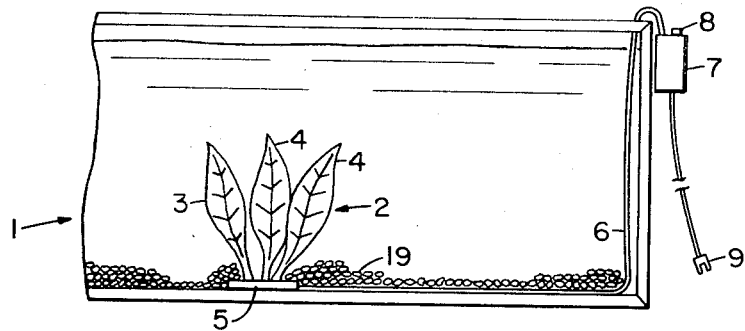
FIG. 1 is a front view of an aquarium containing a heater according to this invention.

Referring now to FIG. 1, an aquarium 1 is shown having the decorative heater assembly 2 located near its center. As shown in this embodiment, the heater is disguised as a plant but other forms such as coral, divers, ships, etc. can be employed. The heater assembly 2 of this embodiment comprises a leaf element 3 containing the heater and temperature sensing elements and dummy leaves 4 all of which may be releasably mounted in base 5. The element 3 is connected to the externally mounted control box 7 by insulated cable 6 formed from solid wires to permit the cable 6 to be permanently bent into desired configuration. The control box is connected to the line by a plug 10 and is provided with a knob 8 for adjusting the temperature control as will be more fully explained below.

Figure 2:
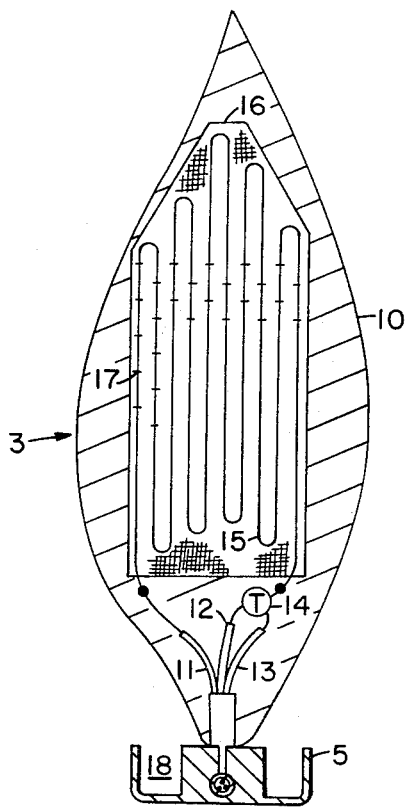
FIG. 2 is a section through a heater element of this invention.

Referring now to FIG. 2, the active element 3 comprises a resistance wire 15 which is completely potted within the electrically insulating mass 10 formed from any suitable rubber or plastic material which may be reinforced with a glass fabric; a particularly useful material is a castable epoxy resin. The resistance heater can be of many forms, but I have found that mounting a nickel-chromium wire on a fabric 16 permits good bonding between the resin and the heater as a result of the impregnation of the fabric by the resin. The wire itself may be sewn directly into the fabric as shown at 19 or it may be affixed to the fabric by separate stitches 17 for example. Sandwiching fabric 16 between sheets of glass fabric gives additional strength to the active element 3. The thermistor 14 and solid wires 11, 12 and 13 forming cable 6 are also embedded in insulating material 10 and are releasably engaged in a channel formed in base 5 as shown in FIG. 2. The thermistor should be sufficiently far from the resistance wire and sufficiently close to the surface of active element 3 so that it may more readily respond to changes in water temperature than changes in the temperature of the resistance wire. This distance will vary with the decorative configuration and the wattage of the heater and can be readily determined by a worker in the art. Base 5 may have recesses 18 in its top to receive gravel to maintain the stability of the assembly.

The heater elements should be covered by a thickness of insulation sufficient to prevent the surface of the active element 3, when immersed in water, from reaching a temperature that would be harmful to fish. Between one-sixteenth inch and one-eighth inch of epoxy resin is adequate for a 50 watt heater.

Figure 3:
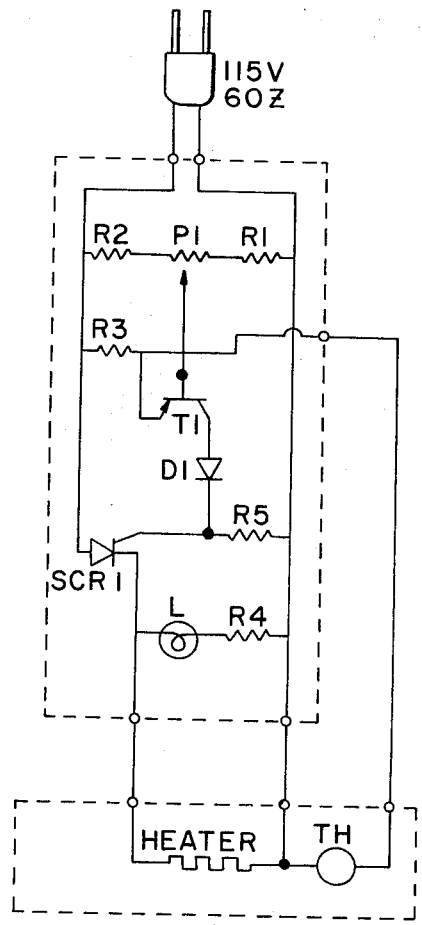
FIG. 3 is a circuit diagram of the electrical components of this invention.

Referring now to FIG. 3, for the embodiment illustrated, $R_1$ is 20K ohm resistor and $R_2$, $R_3$, $R_4$ and $R_5$ are 68K ohm resistors; $P_1$ is a 10K ohm variable resistor; $T_1$ is a resistor, 2N2905 or equivalent; $D_1$ is a diode, 1N4148 or equivalent; the SCR is a TI 116B or equivalent. A lamp L is provided in parallel with the heater to indicate when the heater is operating. Appropriate adjustment of $P_1$ permits control of the temperature at which the electrical characteristics of the thermistor will cause the SCR to trigger allowing current to flow through resistance wire 15. This type of circuit provides a certain degree of proportional control in that less power flows through the heater element as the temperature of the water approaches the preset temperature. This effect occurs because the conduction angle of the SCR changes from 180° for water temperatures significantly below the preset temperatures to 90° at water temperatures slightly below the preset temperature. Thus high power surges are avoided when the heater is maintaining equilibrium, at which time such surges are undesirable, but full power is still available for bulk heating purposes.

While this invention has been described with respect to an embodiment thereof, it should not be construed as limited thereto. Various modification may be made by workers skilled in the art without departing from the scope of this invention which is limited only by the following claims wherein:

I claim:

1. An aquarium heater comprising, in combination:
   a. An electric heater element,
   b. temperature sensing means,
   c. a mass of electrical insulation material in which both said heater element and said temperature sensing means are embedded in direct physical contact with said mass, means for supporting said mass of insulation material
   d. line current supplying means for said heater element,
   e. control means adapted for mounting externally of said aquarium and electrically connected to said line current supplying means, said heater element and said temperature sensing means, said control means being responsive to said temperature sensing means to control flow of electrical power to said heater.

2. The heater of claim 1 wherein said mass of electrical insulation material is formed into a decorative configuration.

3. The heater of claim 2 wherein means for supporting said mass of electrical insulation material on the base of the aquarium comprises releasable base means engaging said decorative mass of electrical insulation material and being adapted to be buried under aquarium gravel.

4. The heater of claim 1 wherein said temperature sensing element is a thermistor.

5. The heater of claim 4 wherein said control means comprises a silicon controlled rectifier controlling current flow to said heater in response to changes in the resistance of said thermistor.

6. The heater of claim 1 wherein said heater and thermistor are connected to said control means by insulated, solid, non-braided wire.

7. An aquarium heater comprising, in combination:
   a. An electric heater element adapted to be supported on the base of an aquarium and comprising a resistance wire stitched into a fabric and embedded in a mass of reinforced plastic electrical insulation,
   b. temperature sensing means adapted to be located within said aquarium,
   c. line current supplying means for said heater element,
   d. control means adapted for mounting externally of said aquarium and electrically connected to said line current supplying means, said heater element and said temperature sensing means, said control means being responsive to said temperature sensing means to control flow of electrical power to said heater.

8. The heater of claim 7 wherein the insulation of said electric heater is formed into a decorative configuration.

9. The heater of claim 8 further comprising releasable base means engaging said decorative mass of electrical insulation material and being adapted to be buried under aquarium gravel.

* * * * *